United States Patent [19]

Schulenberg et al.

[11] 3,815,203
[45] June 11, 1974

[54] APPARATUS FOR APPLYING FINS TO STATIONARILY HELD PIPES BY MEANS OF ENTRAINMENT MEMBERS

[75] Inventors: Heinrich Schulenberg, Bochum; Gunter Seien, Wanne-Eickel, both of Germany

[73] Assignee: Gea Luftkuhler gesellschaft Happel GmbH & Co., KG, Bochum, Germany

[22] Filed: Aug. 7, 1972

[21] Appl. No.: 278,616

[30] Foreign Application Priority Data
Aug. 6, 1971  Germany.......................... 2139382

[52] U.S. Cl............................................... 29/202 R
[51] Int. Cl............................................... B23p 15/26
[58] Field of Search............. 29/200 A, 202 R, 241; 198/170

[56] References Cited
UNITED STATES PATENTS

| | | | |
|---|---|---|---|
| 1,996,566 | 4/1935 | Boerger | 29/202 |
| 2,224,549 | 12/1940 | O'Brien | 29/202 |
| 3,095,639 | 7/1963 | Seien | 29/202 |
| 3,534,848 | 10/1970 | Resener et al. | 198/170 |

Primary Examiner—Lowell A. Larson
Attorney, Agent, or Firm—Michael S. Striker

[57] ABSTRACT

Apparatus for applying fins onto stationary held pipes by means of endless transporting means on which a plurality of plate-shaped parallel entrainment members are mounted each tiltable between a working position extending substantially normal to the pipes and a releasing position. The entrainment members are each provided with at least one glide shoe which during the part of the movement of the entrainment members in which the same moves the fins onto the pipes abuts against support members of an endless chain having a working run adjacent and parallel to that of the endless transporting means and moving in a direction opposite thereto to hold the entrainment members in their working position. After leaving the last of the supporting members on the chain, the entrainment members will automatically tilt to their releasing position. The apparatus further includes restoring means for moving the entrainment members from the releasing position back to the working position during movement of the portion of the endless transporting means carrying the respective member from the idle run to the working run.

13 Claims, 7 Drawing Figures

APPARATUS FOR APPLYING FINS TO STATIONARILY HELD PIPES BY MEANS OF ENTRAINMENT MEMBERS

BACKGROUND OF THE INVENTION

The present invention relates to an apparatus for applying fins onto stationarily held pipes by means of a plurality of plate-shaped entrainment members which are mounted on endless transporting means tiltable between a working position extending substantially normal to the pipes and a releasing position. The entrainment members are each provided with at least one glide shoe which, during the part of the movement of the entrainment members in which the same move the fiins onto the pipes, abuts against support members of an endless chain having a working run adjacent and parallel to that of the endless transporting means but moving in a direction opposite thereto to hold each entrainment member in a working position until the entrainment member leaves the last of the support members on the chain, whereafter the entrainment member will automatically tilt to its releasing position. Means are further provided in the apparatus to move the entrainment members from their releasing position back to their working position during the movement of the entrainment members from the idle run of the endless transporting means back to the working run.

The means for moving the entrainment members from the releasing position back to the working position in the region in which the idle run of the endless transporting means is deflected to the working run comprise in a known apparatus of this type a curved sheet metal guide member which extends through about a quarter of a circle from the working run substantially midway between the latter and the idle run. The glide shoes on the entrainment members will thereby engage during passage of the entrainment members from the idle run to the working run of the endless transporting means the curved sheet metal guide member to be thereby moved from the releasing position to the working position.

Experience has shown that due to the sliding friction between the stationarily arranged curved rigid sheet metal guide member and the slide shoes on the entrainment members especially the sheet metal guide member is subjected to considerable wear. Such wear is especially pronounced at the trailing upper end of the stationarily arranged guide member at which the guide member has to have a very small thickness in order to assure a smooth transition of the glide shoes of the entrainment members from the guide member onto the following support members of the support chain. Likewise, the glide shoes of the entrainment members are subjected in the region of the curved guide member to relatively great wear which reduces the useful life thereof.

SUMMARY OF THE INVENTION

It is an object of the present invention to overcome the above-mentioned disadvantages inherent in apparatus of the aforementioned kind, that is to provide for such an apparatus in which the wear of the various machine elements and especially the wear on the guide means for moving the entrainment members from their releasing back to their working position as well as the wear on the glide shoes of the entrainment members is considerably reduced.

In order to obtain the desired results, the apparatus includes, according to the present invention, on each entrainment member, in addition to the glide shoe adapted to abut the support members of the support chain, a further glide shoe, laterally arranged of the first-mentioned one, which during the passage from the idle run of the endless transporting means to the working run engages the peripheral surface of a guide roller which is freely turnable about a shaft arranged between the runs of the transporting means in the region where the entrainment members pass from the idle run to the working run and which extends normal to a longitudinal plane of symmetry of the transporting means.

By providing such a guide roller, the additional glide shoe on each entrainment member will engage the peripheral surface of the guide roller as the respective entrainment member passes with the endless transporting means from the idle run to the working run of the latter and thereby entrain the freely turnable guide roller by friction so that a sliding friction between the glide shoes on the entrainment members and the peripheral surface of the guide roller will be avoided. The entrainment members which hand downwardly on the idle run of the endless transport means, are thereby during the turning movement of the guide roller returned to their working position so that the entrainment members, as the glide shoes pass from the peripheral surface of the guide roller onto the support members on the support chain adjacent thereto will engage the fins which are preferably supplied seriatim from a press and move the fins onto a stationarily held pipe or pipes which are to be provided with such fins.

Due to the avoiding of a sliding friction between the glide shoes on the entrainment members and the freely turnable guide roller coordinated therewith, the wear on the glide shoes as well as the wear of the means for moving the entrainment members from the releasing to the working position will be considerably reduced as compared with known apparatus of this type. Especially the useful life of the guide roller according to the present invention is considerably extended as compared to the useful life of the rigid sheet guides used in known apparatus so that in the apparatus according to the present invention the idle time for replacement of the worn rigid sheet metal guide member as well as the necessary relatively frequent exchange of the glide shoes will be considerably reduced.

An arrangement in which the means for guiding the chain carrying the support members from the idle run to the working run of the latter are arranged on the same shaft on which the aforementioned guide roller is freely turnably mounted, has proven especially advantageous. The guiding of the endless chain carrying the support members from the idle run to the working run is in this case accomplished closely adjacent to the guide roller which is arranged in the region in which the endless transporting means which carries the entrainment members is passed from its idle run to its working run. This has the advantage that the glide shoes on the entrainment members which cooperate with the support members on the support chain will properly engage the guide faces of the support members at the moment at which the glide shoes cooperating with the guide roller will leave the peripheral surface of the latter, so that each of the entrainment members will be positively held in their working positions without the necessity to provide additional guide means between the guide roller and the support members on the support chain.

Each of the entrainment members may be provided substantially midway between lateral ends with a glide shoe adapted to abut on the support members on the support chain and with at least one laterally arranged additional glide shoe which cooperates with the guide roller. On the other hand, each of the entrainment members may be provided to opposite sides of a substantially centrally arranged glide shoe with two symmetrically thereto arranged additional glide shoes cooperating with a pair of correspondingly arranged guide rollers.

Such arrangements are preferably used in apparatus in which only a small number of pipes is supplied simultaneously with fins, for instance if the apparatus is used for simultaneously applying fins to one to three parallelly arranged pipes. However, in apparatus in which a greater number of pipes arranged adjacent to each other are to be simultaneously supplied with fins, for instance if fins are to be applied simultaneously to four or more pipes which are arranged adjacent and parallel to each other, the apparatus preferably comprises a pair of laterally arranged parallel support chains carrying the support members, each entrainment member being provided with at least two correspondingly laterally arranged glide shoes cooperating with the support members carried by the aforementioned parallel chains, and each entrainment member being provided between the aforementioned glide shoes which cooperate with the support members with at least one additional glide shoe arranged between the other glide shoes thereon which during passage of the endless transporting means from its idle to its working run is guided on the freely turnable guide roller.

Experience has shown, that during simultaneous application of fins onto four or more pipes which are arranged adjacent to each other, the friction between the fins and the pipes will be so great that the forces which are transmitted from the glide shoes onto the support members are so great that the support members on the support chain as well as the glide shoes are subjected to very great wear. If at least two or even a greater number of parallel extending support chains and a corresponding number of glide shoes cooperating with the support members are provided, the forces which are exerted by the glide shoes on the support members of the support chain are maintained small enough so that an undue wear of support members and glide shoes is avoided.

The space between the parallel support chains is in this case advantageously used for the arrangement of one, or possibly also two parallel and spaced freely turnable guide rollers which guide the additional glide shoes provided on the entrainment members and which are arranged between the glide shoes cooperating with the support members.

In the arrangement, each of the entrainment members is provided with two glide shoes which cooperate with the support members on a pair of parallel support chains, which glide shoes are arranged symmetrically with respect to an additional glide shoe on each entrainment member arranged midway between the first mentioned pair of glide shoes and cooperating with the guide roller. This has the advantage that each entrainment member, during the passage of the endless transporting means which carries the entrainment members from the idle run to the upper working run, is on both sides uniformly moved into its working position so that any canting of the entrainment member is avoided.

It has also proven advantageous to construct the glide shoes of each entrainment member of substantially the same configuration, especially with identical height dimensions. It is also advantageous to construct all guide rollers of an apparatus with substantially identical dimensions, especially identical diameters, and to arrange the same on the same shaft. This has the advantage that the individual glide shoes on each entrainment member, regardless whether they are used for guidance on one, two or a plurality of adjacent arranged support chains or for guidance on one or a plurality of guide rollers, may be exchanged against each other so that the stock keeping of such glide shoes is simplified. The same applies to the guide rollers which, if two guide rollers are used, are arranged on the same shaft so that each entrainment member is uniformly moved from its releasing to its working position.

The guide faces of the support members on the support chain or chains are preferably arranged in a plane which is tangential to the peripheral surface of the guide roller or guide rollers. This has the advantage that when the glide shoes cooperating with the guide roller or rollers leave the peripheral surface of the latter, the glide shoes which cooperate with the support members on the supporrt chain or chains will smoothly engage the latter.

Each guide roller is preferably made from wear resistant or surface hardened steel. This will evidently increase the useful life of the guide rollers considerably as compared with the bent metal guide sheets known in the art.

As especially advantageous arrangement is obtained when the shaft on which the guide roller or guide rollers are freely turnably mounted is used simultaneously as drive shaft for the chain or chains carrying the support members. This will result in a very compact arrangement and the possibility to guide the chain or chains carrying the support members from the idle run to the working run thereof closely adjacent to the guide of the endless transporting means which carries the entrainment members from its idle run to its upper working run. The shaft which carries the guide roller or rollers has in this construction a double function whereby the construction of the apparatus according to the present invention is simplified.

The center of curvature of the semicircular formed guide which guides the endless transporting means from its idle run to its working run is, in accordance with a further development of the present invention, preferably downwardly offset for a small dimension with reference to the axis of the shaft of the guide roller, respectively guide rollers. This has the advantage that the semicircular constructed guide which guides the endless transporting means from its idle run to its working run is downwardly offset with respect to the guide roller or rollers for moving the entrainment members from their releasing to their working position so that the glide shoes of the entrainment members which hang downwardly on the idle run of the endless transporting means, will engage only in the lower half of the transition of the transporting means from the idle to the working run the guide roller or rollers, whereas the gap between the semicircular guide for the transporting means and the guide roller, respectively guide rollers will narrow in upward direction in a sickle-shaped manner so that the entrainment members will be smoothly and gradually moved to their active position. It is further advantageous if the center of curvature of the aforementioned semi-circular guide and the axis of the shaft which carries the guide roller, respectively the guide rollers, are arranged in the same vertical plane. This has the advantage that the entrainment members are placed into their vertical active position at the same moment in which their glide shoe, respectively glide shoes engage the uppermost portion of the peripheral surface of the guide roller, respectively guide rollers, to which the guide surface of the support members is tangential.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 5:
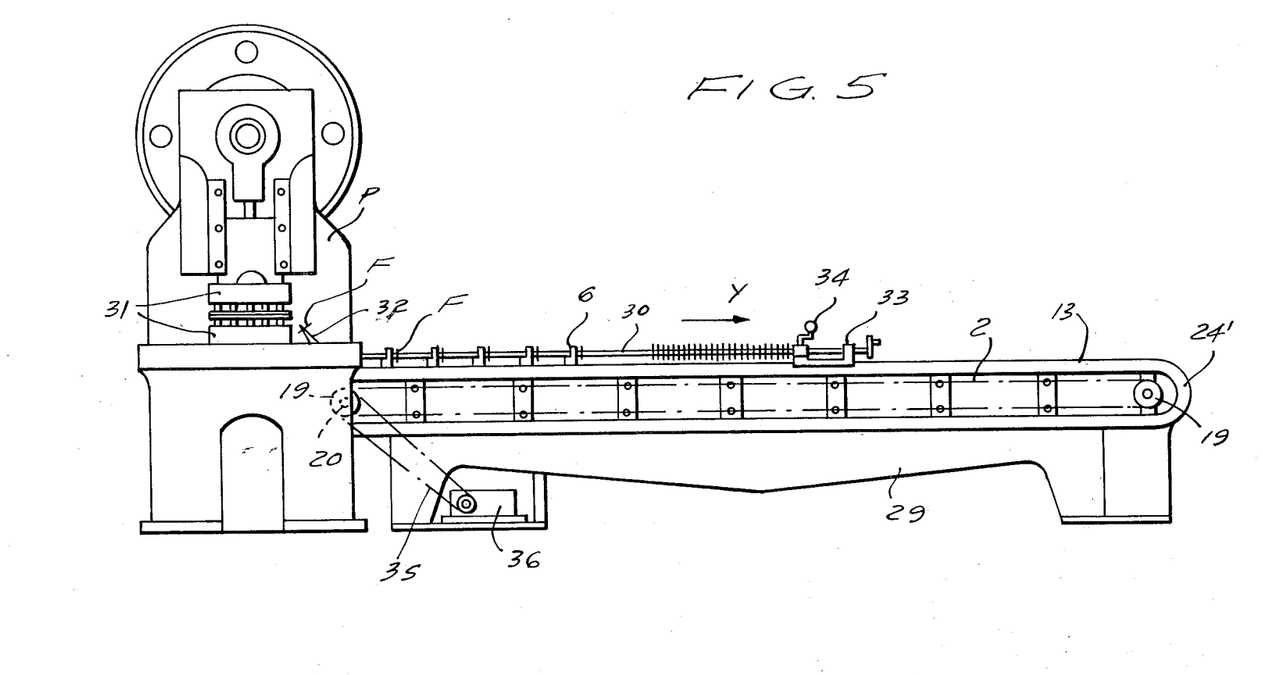
FIG. 5 is a schematic overall side view of an apparatus according to the present invention.

Referring now to the drawing, and more specifically to FIG. 5 of the same, which schematically illustrates in a side view the overall construction of the apparatus according to the present invention for applying fins to stationarily held pipes, it will be seen that the apparatus mainly comprises support means 29 in form of an elongated bench, at one end of which, shown in FIG. 5 as the left end, a punch press P is arranged. The punch press P operates die means 31 mounted thereon which are constructed, in a known manner not forming part of the present invention, to punch fins F from sheet metal fed into the die means 31. Such fins may have a circular outline and be provided with a central circular hole corresponding to the outer diameter of the pipe to which it is to be applied and preferably also with a short axially extending collar surrounding the central opening, or, the fins to be stamped by the die means have an elongated configuration formed with a plurality of circular holes which are spaced in transverse direction of the fin member from each other and axially extending collars about each hole when the fins are to be applied to a plurality of pipes arranged transversely spaced from and parallel to each other, in which the pipes will extend respectively through the holes formed in the single fin member and the latter will also serve to connect the pipes to each other. The fins F stamped by the die means 31 will be fed seriatim by a feeding device of known construction and not shown in the drawing onto one or a plurality of horns 32 which are respectively slipped on the free ends of a plurality of pipes, or a single pipe 30 held at the end or ends spaced from the press P by holding means 33 including clamping means 34 of known construction, which, when tightened, are adapted to clamp the end or ends of the pipes distant from the press P in stationary position. A pair of parallel transversely spaced guide rail means 13, only the front one of which is visible in FIG. 5, are mounted on the upper surface of the bench 29 extending in longitudinal direction of the same. Each of the guide rail means 13 has an upper portion and a lower portion extending downwardly spaced and parallel to the upper portion and the two portions are integrally connected to each other at opposite ends by semicircular connecting portions 24', only the right one being shown in FIG. 5, whereas the left one is hidden by the press P. Each of the guide rail means is substantially U-shaped in cross section, as will be described later on in detail, and serves, will likewise be described later on, to guide endless transporting means in form of sprocket chains 9 which carry a plurality of entrainment members 6 spaced in the longitudinal direction of the chains and constructed and arranged, as will be described later on, to push the fins F in longitudinal direction of the pipe or pipes 30 which are held in stationary position parallel and upwardly spaced from the upper portion of the guide rail means by the aforementioned holding means 33. The holding means 33 is mounted on the upper portion of the guide rail means 13 adjustable in longitudinal direction of the latter so that pipes of different lengths may be held in proper position. The apparatus further includes at least one or a plurality of endless support chains 2 which carry over part of their length a plurality of closely adjacent support members for a purpose as will be described later on. The upper run of the endless support chain or chains extends parallel and downwardly spaced from the upper run of the sprocket chains which carry the entrainment members.

Figure 4:
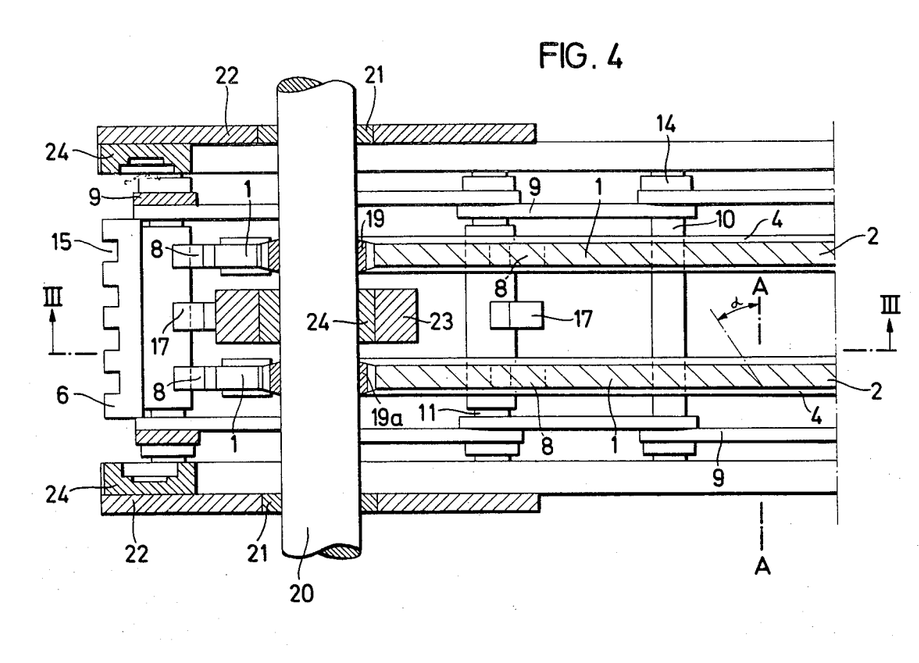
FIG. 4 is a cross section taken along the line Iv—IV of FIG. 3.

Referring now to the other Figures of the drawing, it will be seen that the embodiment of the apparatus illustrated therein comprises a pair of parallel support chains 2, (FIG. 4) which are laterally spaced a small distance from each other and each of which carries over part of its length a plurality of support members 1 which, with the exception of the first and last support members 1a, have in top view a parallelogram configuration. The side faces of the support members 1 extend substantially parallel to each other and substantially parallel to the direction of movement x of the support chains 2. The end faces of the support members 1 are arranged substantially normal to the upper guide face thereof and extend in all support members at an angle α of 40°–60° to a plane A—A normal to the direction of movement x of the support chain. The width of each support member is only 20–25 millimeters, whereas the height thereof is considerably larger. Upwardly extending portions of small plates 3 are transversely aligned with each other and fastened by rivets or the like to opposite side faces of the support members 1, whereas the lower portions 3a of the plates are constructed as links of a sprocket chain 4. Each second link of the sprocket chain 4 is thereby formed by the lower portion 3a of a plate 3 so that the length of each support member 1, with the exception of the first and last support member, is equal to the length of two links of the sprocket chain 4. Adjacent links of this chain are connected by bolts on which rollers 5 (FIG. 2) are turnably mounted.

Figure 1:
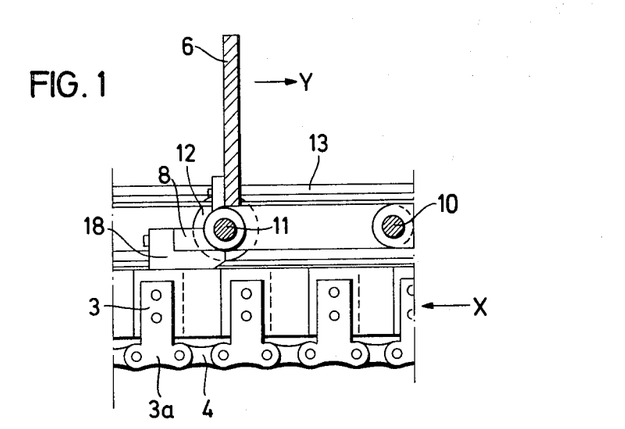
FIG. 1 is a partial, partially sectioned front view of the apparatus according to the present invention.

The entrainment members 6 mounted on endless transporting means 7 are provided at the lower ends with glide shoes 8 which slidingly engage the upper faces of the support members 1. The endless transporting means is constituted in the embodiment illustrated by two sprocket chains 9 the upper runs of which extend parallel to the axes of the pipes to be provided with the fins, and the upper runs of the chains 9 are moved in the direction of the arrow y shown in FIGS. 1, 3 and 5. The links of the chain have a relatively great length, for instance 80–90 millimeters and the links are connected to each other by transverse bolts 10 and 11 which extend through the links of both chains 9. Every second of the aforementioned bolts, that is the bolt 11, is constructed as a turning axis about which axes the entrainment members 6 are tiltable in a direction normal to their advancing direction indicated by the arrow y. The bolts 11 also carry on their outer ends rollers 12 which are guided in the aforementioned rails 13 of U-shaped cross section. The bolts 11 further carry inwardly and closely adjacent to the guide rollers 12 transport rollers 14 freely turnably mounted thereon which are adapted to be engaged by sprocket wheels, not shown in the drawing, for moving the endless transporting means 7 in longitudinal direction.

Figure 2:
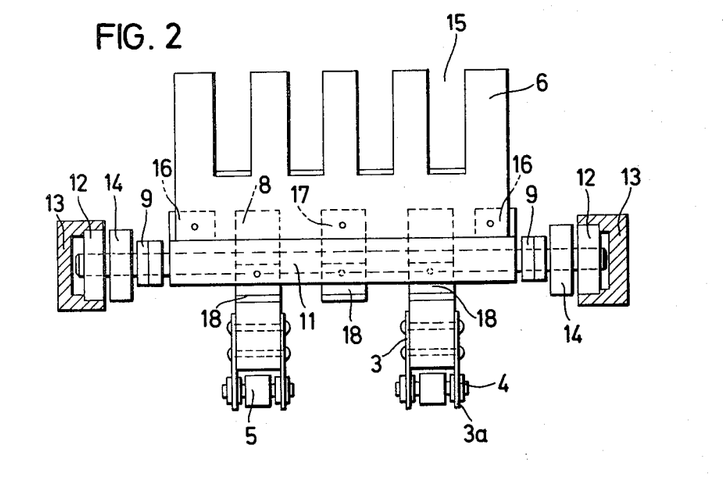
FIG. 2 is an end view, partially in cross section of the elements shown in FIG. 1.

The entrainment members 6 are provided in the embodiment illustrated in the drawing in the upper region, as viewed in FIG. 2, with four cutouts 15 for four pipes which are simultaneously to be provided with fins. The width of each cutout 15 is greater than the outer diameter of the pipes but smaller as the transverse dimensions of the fins. The pipes may be provided with individual fins, but as mentioned before, the fins may extend transversely over a plurality of pipes and be provided with a plurality of transversely spaced openings through which the pipes respectively extend so that the fins form at the same time connecting elements for a plurality of pipes.

Figure 3:
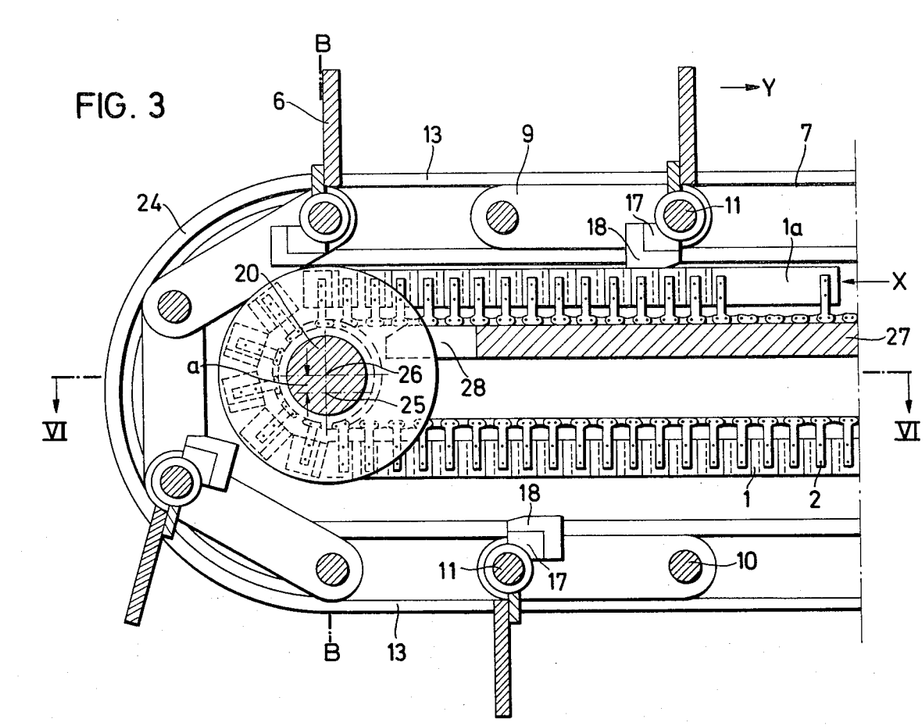
FIG. 3 is a cross section taken along the line III—III of FIG. 4 and showing part of the apparatus which is directed toward a device, not shown in FIG. 33 which supplies fins to be applied to the pipes.

The entrainment members 6 are connected at opposite corners of the lower edges, as viewed in FIG. 3, by screws or the like to lugs 16 projecting in substantially radial direction from opposite ends of a sleeve arranged freely turnably on each bolt 11 between the chains 9. Laterally inwardly of the lugs 16 and arranged symmetrically to a center line of each entrainment member 6 are two glide shoes 8 connected in a similar manner to the sleeve. Arranged between the two lateral glide shoes 8 there is provided an additional glide shoe 17 which is likewise connected to the sleeve. The glide shoes 8 and 17 extend essentially in a direction opposite to the advancing direction of the entrainment member 6 indicated by the arrow y and are each provided at the bottom face thereof with a slide member 18 of wear resistant material and connected to the glide shoe by screws or the like. Due to the arrangement of the glide shoes with respect to the turning axes of the entrainment members 6, the latter are subjected to a turning moment in a direction opposite to the advance direction y of the entrainment members.

The glide shoes 8 and 17 are of identical construction and the two lateral glide shoes 8 are arranged symmetrically to the glide shoe 17 which is arranged midway between lateral edges of the respective entrainment member 6.

The width of each glide shoe 8 in direction transverse to its advancing direction is equal to the width of the support members 1. The lateral distance of the two glide shoes 8 on each entrainment member corresponds to the lateral distance of the support chains 2.

The entrainment members 6 are held in their active positions in which they respectively extend normal to the axes of the pipes to which the fins have to be applied as long as the glide members 18 of the glide shoes thereof slide on the support faces formed by the support chains 2. The support chains 2 are, as mentioned before, constructed as endless sprocket chains each of which has an upper run at least as long as the length of the pipes to be provided with fins, however, only about the half of each support chain is provided with support members. The upper working runs of the two support chains 2 are arranged parallel to the upper runs of the sprocket chains 9 which carry the entrainment members in such a manner that the glide members 18 of the glide shoes 8 engage and extend parallel to the upper guide face provided by the support members 1. The upper working runs of the supporting chains 2 are moved during application of the fins to the pipes in the direction as indicated by the arrow x, that is in direction opposite to the direction of movement y at which the endless transporting means 7 carrying the entrainment members 6 is moved.

The support chains 2 are at the end of the two runs thereof guided over sprocket wheels 19, 19a (FIG. 4) which are keyed to a horizontally arranged drive shaft 20. The teeth of the sprocket wheels 19 and 19a engage the rollers 5 of the sprocket chains 4 to drive the latter.

The drive shaft 20 is turnably mounted in bearings 21 of a housing 22 which is connected in any convenient manner to the guide rail means 13, respectively to the connection portion 24' thereof which connects the upper portion of the guide rail means 13 to the lower portion thereof. A guide roller 23 symmetrically arranged with regard to the two sprocket wheels 19 and 19a is by means of a bushing 24 freely turnably mounted on the drive shaft 20. The guide roller 23 is made from wear resistant or surface hardened steel and has preferably a width greater than that of the glide shoes 17 on the entrainment members 6.

The horizontally arranged upper and lower portions of the guide rail means 13 for the guide rollers 12 of the entrainment members 6 are connected at opposite ends thereof by semicircular connecting portions 24' which have the same U-shaped cross section as the guide rail means 13 and in which the guide rollers 12 of the entrainment members are guided during the passage of the endless transporting means from the lower to the upper run. The centers of curvature 25 of the semicircular connection portions 24' are downwardly displaced from the longitudinal axis 26 of the drive shaft 20 through a distance a which corresponds approximately to half of the radius of the drive shaft 20. The centers of curvature 24 and the axis 26 are however arranged in the same vertical plane B—B (FIG. 3).

The upper runs of the support chain 2 are supported at their bottom sides by a common horizontally extending guide plate 27 which at its end facing the guide roll 23 is provided with a cutout 28 for the latter.

As shown in FIG. 3, the guide surface formed by the support memebers 1 and 1a for the glide shoes 8 of the entrainment members 6 is substantially tangential to the peripheral surface of the guide roller 23.

A relatively wide gap is provided between the bottom side of the guide roller 23 and the surface of the guide rails 13, respectively 24', for the guide rollers 12 of the entrainment members 6. This gap gradually decreases in a sickle-shaped manner in upward direction so that the glide shoes 17 of the entrainment member 6 will engage the peripheral surface of the guide roller 23 only at a certain distance from the idle run of the transporting means to frictionally rotate the guide roller 23, whereby the entrainment members 6 are gradually moved to their vertically extending active position to reach the latter at the highest point of the guide roller 23. At this moment in which the entrainment members reach its vertically extending active position, the lateral glide shoes 8 will engage the guide surface formed by the upper faces of the support members 1 on the support chains 2 which move in the direction x so that during further movement of the entrainment members in the direction y, the guide of the entrainment members 6 will be taken over without any jolt by the two support chains 2.

The above-described apparatus operates as follows:

After a plurality of pipes have been clamped in proper position by the holding and clamping means 33, 34, the press P is started and simultaneously or shortly thereafter the drive for the endless transporting means carrying the entrainment members 6 as well as the drive of the support chains 2 is started whereby the entrainment members 6 on the upper run of the endless transporting means are moved in the direction as indicated by the arrows y, whereas the support chains are moved in the opposite direction as indicated by the arrows x. Before start of movement of the endless transporting means and the support chains, the position of the supporting chain is adjusted in such a manner so that when the first fin moved by the corresponding entrainment member 6 reaches the desired end position on the pipes, the trailing end of the trailing support member 1a will pass the lateral glide shoes 8 on this entrainment member and free the latter so that the entrainment member may tilt from its vertical active position in counterclockwise direction to its releasing position to thereby become disengaged from the respective fin, and the entrainment member will then move in this releasing position until it iss moved by engagement of its central glide shoe 18 with the peripheral surface of the guide roller 23 so as to be moved as described above from its releasing back to its active position.

It will be understood that each of the elements described above, or two or more together, may also find a useful application in other types of apparatus for applying fins to stationarily held pipes differing from the types described above.

Figure 6:
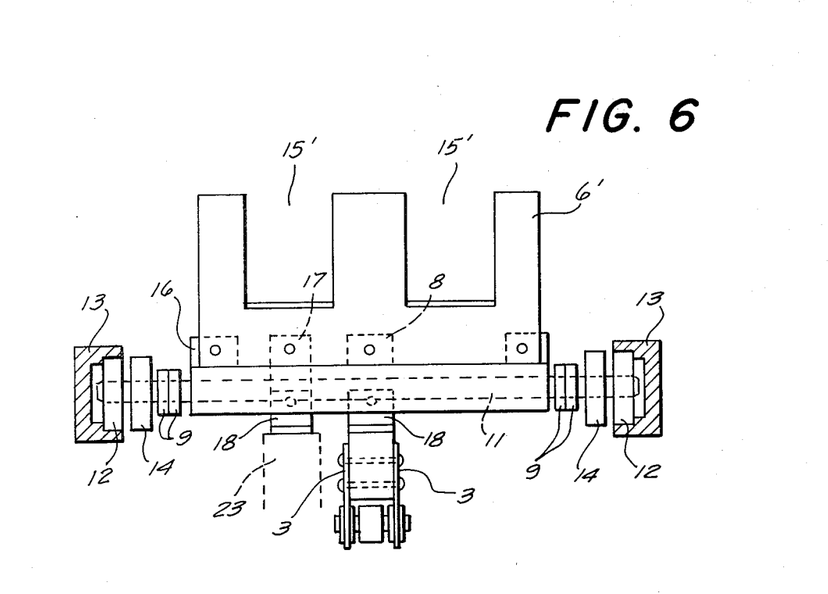
FIG. 6 is an end view, partially in cross section, of the elements shown in FIG. 1 according to a modified embodiment of the present invention.

One of the modified embodiments, which is illustrated in FIG. 6, comprises only a single support chain 2 and each entrainment member 6 is provided with only one glide shoe 8 associated with the single support chain and the glide member 18 thereof engages and extends parallel to the upper side provided by the support members 1 of the single support chain 2. In this embodiment, the glide shoe 8 is arranged midway between the lateral edges of the respective entrainment member 6, and an additional glide shoe 17 is arranged laterally of the glide shoe 8 so as to come into contact with a single guide roller 23 mounted on the drive shaft 20 laterally of the sprocket wheel 19 so as to be freely turnable with respect to the shaft 20.

Figure 7:
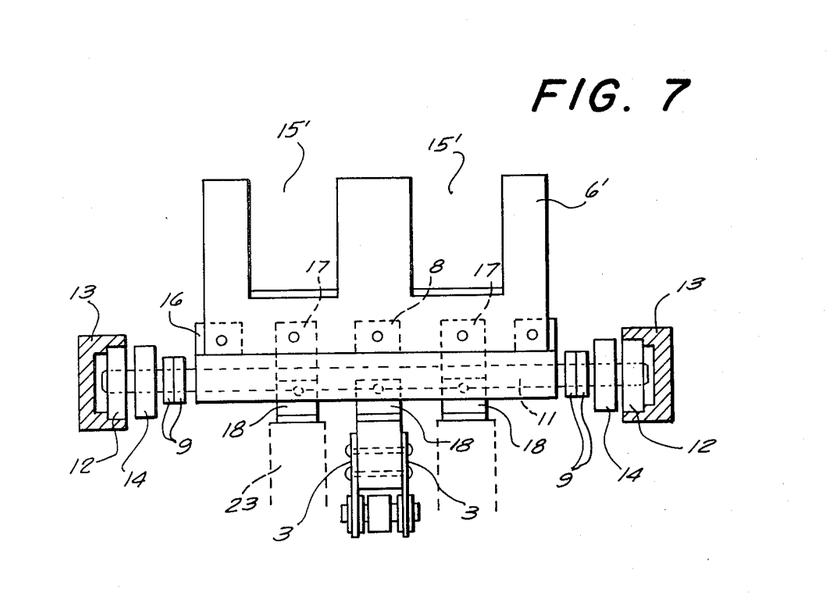
FIG. 7 is an end view, partially in cross section, of the elements shown in FIG. 1 according to a further modification of the present invention.

Another modified embodiment shown in FIG. 7 is similar to the just described modified embodiment in all respects but for the fact that two additional glide shoes 17 are provided laterally and symmetrically of the glide shoe 8 and two guide rollers 23 are freely turnably mounted on the drive shaft 20 and cooperate with the glide member 18 of the glide shoes 17 of the respective entrainment members 6 so as to move the respective entrainment member 6 from its releasing to its active position.

In all other respects, except for the abovementioned modification, the modified embodiments are similar to the embodiments shown in FIGS. 1 to 5 and are operated similarly. The modified arrangements are particularly advantageous if a small number of pipes 30 is to be provided with fins.

While the invention has been illustrated as described as embodied in a apparatus for applying fins to stationarily held pipes by means of entrainment members movable between a working position and a releasing position, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Apparatus for applying fins onto stationarily held pipes comprising endless transporting means having a working run movable in a first direction and extending substantially parallel and adjacent to the stationarily held pipes, an idle run and a pair of reversing portions connecting said working run with said idle run; a plurality of substantially parallel plate-shaped entrainment members mounted spaced from each other on said endless transporting means for movement therewith and each freely tiltable about a tilting axis between a working position extending substantially normal to the axes of the pipes and a releasing position; at least one endless chain having a working run substantially parallel and adjacent to said working run of said endless transporting means and being movable in a second direction opposite to said first direction; a plurality of closely adjacent support members carried by said endless chain over part of the length thereof; at least one glide shoe carried 1 by each entrainment member and abutting against said support members during movement of said working run of said transporting means and said chain in opposite directions so as to hold the respective entrainment member in said working position until the glide shoe of the respective entrainment member leaves the last support member on said chain and tilts to its releasing position; and restoring means for moving each of said entrainment members from said releasing position back to said working position and comprising at least one guide roller mounted for free rotation about and with respect to a shaft arranged between said runs of said transporting means in the region where said endless transporting means and the entrainment members thereon pass from the idle to the working run, said shaft extending normal to a longitudinal plane of symmetry of said transporting means, and at least one additional glide shoe on each entrainment member engaging the peripheral surface of the guide roller during passage of the entrainment member through said region so as to set said guide roller into rotation whereby to substantially eliminate sliding contact between said glide shoe and said peripheral surface and thereby to reduce wear of the same.

2. Apparatus as defined in claim 1, wherein each entrainment member has a pair of side edges and said one glide shoe which abuts against said support members is arranged substantially midway between said side edges, and the additional glide shoe is laterally arranged from said one glide shoe.

3. Apparatus as defined in claim 1, wherein each entrainment member has a pair of lateral edges and said one glide shoe which abuts against said support members is arranged substantially midway between said side edges; and further comprising two additional glide shoes arranged laterally of and symmetrically to said one glide shoe, and two guide rollers mounted for free rotation about and with respect to said shaft and cooperating with said two additional glide shoes.

4. Apparatus as defined in claim 3, wherein said two guide rollers have the same diameter.

5. Apparatus as defined in claim 1, wherein two endless chains are provided extending spaced from and parallel to each other and each carrying a plurality of closely adjacent support members along part of the length thereof, and wherein each of said entrainment members carries two glide shoes respectively abutting against the support members on the two chains, said additional glide shoe cooperating with said guide roller being arranged between said two first mentioned glide shoes.

6. Apparatus as defined in claim 5, wherein each of said entrainment members has a pair of side edges and wherein said additional glide shoe cooperating with said guide roller is arranged midway between said side edges and said two glide shoes cooperating with said support members are arranged symmetrically with respect to said additional glide shoe.

7. Apparatus as defined in claim 1, wherein all glide shoes are of substantially the same construction and having an abutment face adapted to abut onto corresponding faces of said support members, respectively said guide roller, the distance of the abutment face from said tilting axis being the same for all glide shoes.

8. Apparatus as defined in claim 1, wherein each of said support members has a support face adapted to be engaged by the respective glide shoe, the support faces of the support members on the working run of said chain being located in a plane which is tangential to the periphery of said guide roller.

9. Apparatus as defined in claim 1, wherein at least a portion of the guide roller which includes its peripheral surface is formed from wear resistant material.

10. Apparatus for applying fins onto stationarily held pipes comprising endless transporting means having a working run movable in a first direction and extending substantially parallel and adjacent to the stationarily held pipes, an idle run and a pair of reversing portions connecting said working run with said idle run; a plurality of substantially parallel plate-shaped entrainment members mounted spaced from each other on said endless transporting means for movement therewith and each freely tiltable about a tilting axis between a working position extending substantially normal to the axes of the pipes and a releasing position; at least one endless chain having a working run substantially parallel and adjacent to said working run of said endless transporting means and being movable in a second direction opposite to said first direction; a plurality of closely adjacent support members carried by said endless chain over part of the length thereof; at least one glide shoe carried by each entrainment member and abutting against said support members during movement of said working run of said transporting means and said chain in opposite directions so as to hold the respective entrainment member in said working position until the glide shoe of the respective entrainment member leaves the last support member on said chain and tilts to its releasing position; restoring means for moving each of said entrainment members from said releasing position back to said working position and comprising at least one guide roller freely turnable about a shaft arranged between said runs of said transporting means in the region where said endless transporting means and the entrainment members thereon pass from the idle to the working run, said shaft extending normal to a longitudinal plane of symmetry of said transporting means, and at least one additional glide shoe on each entrainment member engaging the peripheral surface of the guide roller during passage of the entrainment member through this region; and guide means for guiding said endless chain carrying the support members from the idle run to the working run thereof, said guide means being arranged on the same shaft on which said guide roller is freely turnably mounted.

11. Apparatus as defined in claim 10, and including guide means for guiding said endless transporting means from its idle run to its working run, said guide means comprising substantially semi-circular guide rails having their centers of curvature midway between said runs, and wherein the center line of said shaft is nearer to said working run than to said idle run.

12. Apparatus as defined in claim 11, wherein said runs extends substantially horizontally, and wherein said center of curvature and the axis of said shaft are located in the same vertical plane.

13. Apparatus for applying fins onto stationarily held pipes comprising endless transporting means having a working run movable in a first direction and extending substantially parallel and adjacent to the stationarily held pipes, an idle run and a pair of reversing portions connecting said working run with said idle run; a plurality of substantially parallel plate-shaped entrainment members mounted spaced from each other on said endless transporting means for movement therewith and each freely tiltable about a tilting axis between a working position extending substantially normal to the axes of the pipes and a releasing position; at least one endless chain having a working run substantially parallel and adjacent to said working run of said endless transporting means and being movable in a second direction opposite to said first direction; a plurality of closely adjacent support members carried by said endless chain over part of the length thereof; at least one glide shoe carried by each entrainment member and abutting against said support members during movement of said working run of said transporting means and said chain in opposite directions so as to hold the respective entrainment member in said working position until the glide shoe of the respective entrainment member leaves the last support member on said chain and tilts to its releasing position; restoring means for moving each of said entrainment members from said releasing position back to said working position and comprising at least one guide roller freely turnable about a driven shaft arranged between said runs of said transporting means in the region where said endless transporting means and the entrainment members thereon pass from the idle to the working run, said shaft extending normal to a longidutinal plane of symmetry of said transporting means, and at least one additional glide shoe on each entrainment member engaging the peripheral surface of the guide roller during passage of the entrainment member through this region; and means fixed to said driven shaft for driving said at least one endless chain.

* * * * *